2,790,011
PROCESS FOR THE RECOVERY OF PENTAERYTHRITOL

Walter Pohl, Frankfurt am Main, and Heinrich Kraft, Bruchhausen, near Arnsberg, Germany, assignors to Deutsche Gold- und Silber-Scheideanstalt vormals Roessler, Frankfurt am Main, Germany No Drawing. Application June 19, 1953, Serial No. 362,949

Claims priority, application Germany July 3, 1952

4 Claims. (Cl. 260—637)

The present invention relates to an improved process for the recovery of pentaerythritol from crude pentaerythritol solutions obtained in condensation of acetaldehyde and formaldehyde in the presence of hydrate lime as the condensing agent.

It is already known that crude pentaerythritol solutions obtained in the condensation of acetaldehyde and formaldehyde in the presence of hydrated lime can be worked up by concentrating such solutions by evaporization to separate off the calcium formate contained therein in crystalline form while retaining the pentaerythritol in solution. The crystalline calcium formate was filtered off from the hot solution and the pentaerythritol was recovered in crystalline form from the filtrate upon cooling. The pentaerythritol thus obtained is rather contaminated, as it crystallizes out of a saturated calcium formate solution and consequently must be purified by recrystallization.

It has been unexpectedly found according to the invention that it is possible to recover commercially pure pentaerythritol directly from such crude pentaerythritol solutions without necessitating any recrystallization. In the procedure according to the invention, the crude pentaerythritol solution is first only evaporated to such a concentration that after cooling, all of the calcium formate therein still remains in solution while a portion of the pentaerythritol crystallizes out upon such cooling. The resulting crystallized pentaerythritol (fraction I) can be separated from the solution, for example, by a sieve centrifuge whereby it is obtained in such a pure form that recrystallization is superfluous.

The filtrate which has thus been freed of the crystallized pentaerythritol is then evaporated to such a concentration that the major portion of the calcium formate crystallizes out. It is possible to recover 70–80% of the calcium formate in this manner without having the pentaerythritol crystallize out. The calcium formate which crystallizes out must be removed from the solution while it is hot by filtration for example, in a heated centrifuge in order to prevent simultaneous separation of the pentaerythritol. Upon cooling of the filtrate the pentaerythritol separates out (fraction II) and can be recovered by filtration. The pentaerythritol fraction II is less pure than fraction I in view of the increased concentration of by-products in the mother liquor and consequently must be recrystallized. It has been found advantageous to redissolve such fraction II in water and recycle the solution to an appropriate point in the process, for example, to fresh crude solution. In the latter instance all of the pentaerythritol produced is recovered as fraction I.

As is well known, dipentaerythritol is produced as a by-product in certain proportions depending upon the condensation conditions employed in the production of pentaerythritol. Consequently, when the process according to the invention is carried out in accordance with the modification described above wherein a solution of fraction II is recycled to the crude solution so that the entire pentaerythritol is recovered in fraction I, such fraction I naturally also contains dipentaerythritol and must be purified by recrystallization if pure mono-pentaerythritol is desired. It is, however, more expedient, if pure pentaerythritol is desired, to recrystallize fraction II as this fraction in and by itself contains less dipentaerythritol. The larger mono-pentaerythritol crystals are fractionated by a suitable fine meshed sieve and the filtrate containing the finer dipentaerythritols can be recycled to a suitable point in the process, for example, before separation of the pentaerythritol fraction I so that the dipentaerythritol is recovered with fraction I.

The crude pentaerythritol solution obtained by the condensation reaction described is alkaline and on concentration such solution by evaporation discoloration occurs and fraction I which is obtained therefrom still contains certain disturbing impurities. These can be avoided according to the invention by adjusting the crude condensation solution to a pH between 7 and 8, preferably 7.2 by the addition of formic acid, and filtering the resulting solution cold whereby the undesirable polypentaerythritol obtained as a by-product as well as any insoluble inorganic impurities (derived from the lime) are removed.

The mother liquor remaining after separation of fraction II can be concentrated by evaporation to recover further quantities of calcium formate and pentaerythritol. In such case, calcium formate again crystallizes in the hot solution being concentrated and is filtered off from the hot solution and pentaerythritol (fraction III) crystallizes upon cooling of the filtrate. This fraction naturally contains more impurities than fraction II. The remaining mother liquor thus obtained is more concentrated in the syrupy by-products produced in the condensation reaction than the mother liquor from fraction II so that there are limits to its being returned to the process. It is, however, possible to work up such mother liquor further employing the thermal treatment under pressure described in copending application Serial No. 273,736, filed February 27, 1952, now Patent No. 2,749,370.

The following example will serve to illustrate the novel process according to the invention.

Example

A crude aqueous pentaerythritol solution, obtained in the condensation of acetaldehyde and formaldehyde in the presence of hydrated lime, having a density of 1.09 and containing 8–10% of pentaerythritol and 7% of calcium formate was adjusted to a pH of 7.2 by the addition of concentrated formic acid. After cooling the solution to 25° C. and permitting it to stand for two hours, it was filtered to remove poly pentaerythritol and insoluble impurities. The filtered solution was then concentrated by boiling it down until a density of 1.15 (measured at 55° C.) was reached and then cooled to 25° C. The pentaerythritol, which crystallized out, was filtered off in a centrifuge, given a short wash and dried. The pentaerythritol thus recovered (fraction I) amounted to 60% of that contained in the solution. The filtrate was then further concentrated by boiling it down until its solid content was about 11–12% whereby crystalline calcium formate separated out, which was filtered off hot and washed with hot water or steam. The calcium formate thus recovered amounted to 73% of that contained in the solution. After cooling the filtrate, pentaerythritol separated out and was filtered off (fraction II). The quantity thus recovered amounted to about 30% of that contained in the original crude solution.

Fraction I of the pentaerythritol which was recovered from the calcium formate containing solution without recrystallization was of pure white color and had an ash content of only 0.05 to 0.07%. Its melting point was 218–245° C. and the content in mono-pentaerythritol was 85%. A product of this purity can be employed directly for many technical applications, for example, in the production of lacquer resins.

The process according to the invention provides a number of important and economical advantages. Contrary to most previously employed processes, it does not require the use of chemicals with the exception of very slight amounts of formic acid, to obtain pentaerythritol in technically pure form and high yield without requiring further measures. Furthermore, if it is necessary to free a portion of pentaerythritol from the dipentaerythritol, it is possible to effect such separation in a simple manner by appropriate modification of the process as described above.

We claim:

1. A process for the recovery of pentaerythritol from crude aqueous pentaerythritol solutions containing calcium formate obtained in the condensation of acetaldehyde and formaldehyde in the presence of hydrated lime as the condensing agent which comprises adding formic acid to such crude solution to adjust the pH to a value between 7 and 8, then boiling down such crude aqueous solution only to such a degree that the calcium formate contained therein does not crystallize out even after cooling but pentaerythritol crystallizes from such aqueous solution upon cooling, cooling such concentrated solution to crystallize pentaerythritol, separating the crystallized pentaerythritol from such aqueous solution to obtain a first fraction of pentaerythritol then boiling down the resulting aqueous solution until the major portion of the calcium formate contained therein crystallizes out, separating the crystallized calcium formate from such aqueous solution while hot and subsequently crystallizing pentaerythritol from the remaining aqueous solution to obtain a second fraction of pentaerythritol.

2. A process according to claim 1, in which such crude solution is adjusted to a pH of 7.2 by addition of formic acid before it is boiled down.

3. A process according to claim 1, comprising in addition redissolving said second fraction of pentaerythritol and returning such solution to the crude solution before the first fraction of pentaerythritol is crystallized therefrom.

4. A process according to claim 1 in which the crude solution to which formic acid has been added is filtered cold to remove polypentaerythritol and any solid impurities present before it is boiled down.

References Cited in the file of this patent

UNITED STATES PATENTS

| Re. 23,584 | Jackson et al. | Nov. 18, 1952 |
| 2,420,497 | Poitras et al. | May 13, 1947 |
| 2,441,602 | Snow et al. | May 18, 1948 |
| 2,441,944 | Remensnyder et al. | May 18, 1948 |
| 2,696,507 | Cake | Dec. 7, 1954 |

FOREIGN PATENTS

| 535,399 | Great Britain | Apr. 8, 1941 |

OTHER REFERENCES

Vogel: Textbook of Practical Organic Chemistry, Longmans, Green & Co., New York, (1948), pp. 122–3.

Lange: Handbook of Chemistry 8th edit. (1952), pp. 216–17.